United States Patent
Brough et al.

(10) Patent No.: US 9,449,350 B2
(45) Date of Patent: *Sep. 20, 2016

(54) PROMPTING SERVICE

(71) Applicant: HALLMARK CARDS, INCORPORATED, Kansas City, MO (US)

(72) Inventors: Emily Gallagher Brough, Kansas City, MO (US); Eddy Dywayne Johnson, Kansas City, MO (US); Kevin John Bridges, Leawood, KS (US); Jason Blake Penrod, Shawnee, KS (US); Kirby Bouas McDaniel, Parkville, MO (US)

(73) Assignee: HALLMARK CARDS, INCORPORATED, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/466,595

(22) Filed: Aug. 22, 2014

(65) Prior Publication Data

US 2015/0012450 A1    Jan. 8, 2015

Related U.S. Application Data

(63) Continuation of application No. 13/112,900, filed on May 20, 2011, now Pat. No. 8,819,169.

(51) Int. Cl.
*G06Q 30/02* (2012.01)
*G06Q 50/00* (2012.01)

(52) U.S. Cl.
CPC .......... *G06Q 50/01* (2013.01); *G06Q 30/0281* (2013.01)

(58) Field of Classification Search
CPC .......... G06Q 50/01; G06Q 30/0281
USPC .......... 709/203, 207, 214, 217, 219
See application file for complete search history.

(56) References Cited

U.S. PATENT DOCUMENTS 6,123,362 A    9/2000  Squilla et al.
6,461,166 B1 * 10/2002  Berman .................. G09B 7/04
                                                                434/322

(Continued)

FOREIGN PATENT DOCUMENTS

WO        0013121 A1    3/2000
WO    2008022328 A2    2/2008

OTHER PUBLICATIONS

BabyCenter Record a Milestone service (www.babycenter.com), Feb. 18, 2011, 10 pages.

(Continued)

*Primary Examiner* — Maharishi Khirodhar
*Assistant Examiner* — Natali N Pascual Peguero
(74) *Attorney, Agent, or Firm* — Shook, Hardy & Bacon L.L.P.

(57) ABSTRACT

Computer-readable media, systems, and methods are provided for prompting a customer of a service to submit digital content to the service in order to generate an online compilation. Input from the customer may be received in response to communications from the service. Temporal preference information may then be extracted from the input by determining time periods at which the customer most commonly provides the input in response to the communications. Based on the time periods at which the customer most commonly provides input, a prompting scheme may be derived, where the prompting scheme governs scheduling an automatic distribution of subsequent communications to the customer at the time periods at which the customer most commonly provides the input. The subsequent communications may then be distributed to the customer in accordance with the prompting scheme.

20 Claims, 9 Drawing Sheets

(56) References Cited

U.S. PATENT DOCUMENTS

| | | |
|---|---|---|
| 6,782,397 B2 | 8/2004 | Tanaka |
| 6,901,379 B1 | 5/2005 | Balter et al. |
| 7,019,871 B2 | 3/2006 | Risheq |
| 7,403,212 B2 | 7/2008 | Schick et al. |
| 7,536,324 B2 | 5/2009 | Perkowski |
| 7,853,479 B2 | 12/2010 | Bengson |
| 8,515,829 B1* | 8/2013 | Conway ................. G06Q 30/00 705/26.1 |
| 2002/0046242 A1* | 4/2002 | Kuroiwa ................. G06Q 30/02 709/203 |
| 2002/0097259 A1 | 7/2002 | Marshall et al. |
| 2003/0090498 A1 | 5/2003 | Schick et al. |
| 2005/0099385 A1 | 5/2005 | Schick et al. |
| 2006/0218034 A1* | 9/2006 | Kelly ................. G06F 11/3476 434/350 |
| 2008/0172381 A1 | 7/2008 | Suh |
| 2008/0313057 A1* | 12/2008 | Gooch ................... G06Q 10/00 705/26.1 |
| 2009/0048940 A1 | 2/2009 | Hill et al. |
| 2009/0234667 A1 | 9/2009 | Thayne |
| 2009/0265639 A1 | 10/2009 | Shuster |
| 2009/0282085 A1* | 11/2009 | Billard ................. G06F 9/4443 |
| 2009/0287990 A1* | 11/2009 | Lynton .............. G06F 17/30056 715/209 |
| 2010/0131573 A1 | 5/2010 | Reese et al. |
| 2010/0131882 A1 | 5/2010 | Reese et al. |
| 2010/0185547 A1 | 7/2010 | Scholar |
| 2010/0312609 A1 | 12/2010 | Epshtein et al. |
| 2011/0055225 A1* | 3/2011 | Firminger .............. G06Q 10/10 707/749 |
| 2012/0046937 A1 | 2/2012 | Ocke et al. |
| 2012/0278412 A1* | 11/2012 | Walsh ................. H04L 12/6418 709/206 |

OTHER PUBLICATIONS

Canadian Examiner's Report regarding Canadian Appl. No. 2753013 dated Oct. 4, 2013, 5 pages.

Moment Garden service (www.momentgarden.com), Feb. 21, 2011, 4 pages.

Final Office Action dated Jan. 28, 2014 in U.S. Appl. No. 13/112,900, 24 pages.

Notice of Allowance dated Apr. 4, 2014 in U.S. Appl. No. 13/112,900, 7 pages.

Canadian Examiner's Report dated Jul. 7, 2015 in Canadian Application No. 2,753,013, 5 pages.

Canadian Notice of Allowance dated Nov. 17, 2015 in Application No. 2,753,013, 1 page.

Canadian Office Action dated Feb. 11, 2016, in Application No. 2,918,046, 6 pages.

* cited by examiner

| BABY'S AGE (IN WEEKS) | ONCE A WEEK | TWICE A WEEK | THREE TIMES A WEEK | FOUR TIMES A WEEK |
|---|---|---|---|---|
| 1 | UPLOAD A PICTURE OF YOUR PRECIOUS NEW ARRIVAL TO GO WITH THIS CAPTION: OUT OF OUR DREAMS AND INTO OUR ARMS… WELCOME, (MAX THOMAS SMITH) (FRIDAY, JUNE 20TH) AT (12:09 PM). (7 LBS. 7 OZ)(20 ½) INCHES LONG. | TO SEE YOU AND HOLD YOU FOR THE FIRST TIME (MAX)… THERE ARE SIMPLY NO WORDS FOR THAT. (DAD AND I) COUNTED YOUR TINY FINGERS AND TOES, STROKED YOUR (BLACK HAIR, TINY HEAD) AND MARVELED AT HOW PERFECT YOU WERE…ALL (10 ½ LBS) OF YOU. IT REALLY WAS LOVE AT FIRST SIGHT. | ASK ONE OF YOUR NURSES OR HOSPITAL VISITORS TO TAKE A PICTURE OF YOUR FAMILY TOGETHER WITH THE NEWEST LITTLE MEMBER TO GO ALONG WITH THIS CAPTION. …AND BABY (MAX) MAKES (3) | WHEN YOU WERE BORN, (MAX)… SOMEDAY, WHEN YOU TELL (MAX) ABOUT HIS BIRTH, WHAT DETAILS AND FEELINGS DO YOU WANT TO BE SURE YOU REMEMBER TO TELL HIM? TRY STARTING WITH THIS: (MAX)— THE DAY YOU WERE BORN WAS A DAY I'LL NEVER FORGET… |
| 3 | (MAX)'S STATS AT 2 WEEKS (MAX)—HERE ARE YOUR BIG NUMBERS AT JUST A LITTLE OVER TWO WEEKS OLD. WEIGHT:_____ LENGTH:_____ HEAD:_____ DIAPER SIZE:_____ CLOTHING SIZE:_____ FEEDINGS PER DAY:_____ DIAPERS PER DAY:_____ NAPS PER DAY:_____ LONGEST STRETCH OF SLEEP AT NIGHT:_____ | UPLOAD A PHOTO OF (MAX) SLEEPING TO GO ALONG WITH THIS CAPTION: PERFECT PEACE. | (MAX)-- YOU COMING INTO OUR LIVES IS THE MOST (BEAUTIFUL BLESSING, HAPPIEST THING) WE COULD HAVE EVER ASKED FOR. WE DON'T KNOW WHAT (YOUR FIRST WORD WILL BE) OR (WHEN YOU'LL TAKE YOUR FIRST STEP), BUT WE DO KNOW ONE VERY IMPORTANT THING- - WE'LL LOVE YOU FOREVER. WE ALREADY DO. | BIG HAND-LITTLE HAND TAKE A PHOTO OF (MAX)'S TINY BABY HAND ALONG WITH YOUR HAND OR ONE OF (MAX)'S GRANDPARENT'S HANDS TO GO WITH THE CAPTION BELOW. SOMEDAY YOU'LL LOOK BACK AND BE AMAZED THAT THERE WAS A TIME WHEN (MAX) COULDN'T WRAP HIS HAND ALL THE WAY AROUND ONE OF YOUR FINGERS: WE'RE WRAPPED AROUND YOUR TINY FINGERS, (MAX). |

FIG. 2.

| | | | |
|---|---|---|---|
| 6 | FAVORITE THINGS ABOUT (MAX)<br>FAVORITE SPOT TO KISS ON (MAX):<br><br>FAVORITE SOUND HE MAKES:<br><br>FAVORITE TIME OF DAY WITH (MAX):<br><br>FAVORITE FACE HE MAKES:<br><br>FAVORITE OUTFIT HE WEARS:<br><br>FAVORITE PLACE TO GO WITH (MAX) | A TYPICAL DAY (IN PHOTOS) EVEN THOUGH LIFE WITH (MAX) IS STILL PRETTY UNPREDICTABLE, FOCUS YOUR CAMERA ON THE THINGS YOU CAN COUNT ON EVERY DAY. TAKE PICTURES OF A FEEDING, A DIAPER CHANGE, A WALK AROUND THE BLOCK, OR ANYTHING ELSE THAT CAPTURES THE RHYTHM OF THESE FIRST SWEET, WILD DAYS WITH YOUR BABY BOY. PAIR YOUR PHOTOS UP WITH THIS CAPTION: WHAT'S THE BEST PART OF LIFE WITH (MAX)? THAT'S EASY... EVERYTHING. | IS (MAX) HOLDING HIS HEAD UP LIKE A CHAMP THESE DAYS? WHAT ELSE IS NEW WITH YOUR LITTLE SUPER BABY IN TRAINING? ←250 | (MAX)'S) EMERGING TALENTS IS (MAX) COOING LIKE CRAZY NOWADAYS? DOES HE HAVE A WAY WITH SPIT BUBBLES? WHAT ELSE HAS HE GOTTEN GOOD AT LATELY? ←260 |
| 7 | MY BIGGEST DREAM FOR YOU, (MAX)... THAT YOU'LL ALWAYS (KNOW YOU'RE LOVED, TRUST YOUR HEART) | PHOTO MEASURING STICK-- TAKE 2 REMEMBER THAT STUFFED ANIMAL (OR OTHER PROP) YOU PHOTOGRAPHED WITH (MAX) LAST MONTH? IT'S TIME TO BRING IT OUT AGAIN FOR ANOTHER PICTURE. HOW IS (MAX) MEASURING UP THIS TIME? AGAIN, BE SURE TO HANG ON TO THIS ITEM SO YOU CAN PHOTOGRAPH (MAX) WITH IT AGAIN IN ANOTHER MONTH OR SO. (DON'T WORRY--- WE'LL REMIND YOU) | GOT HAIR?<br>BALD PATCHES AND CRADLE CAP AND BABY MULLETS, OH MY! HOW IS (MAX)'S HEAD OF HAIR HOLDING UP? CONSIDER UPLOADING A PHOTO OR TWO TO CAPTURE (MAX)'S CURRENT HAIRSTYLE BEFORE IT CHANGES! | (MAX)'S LOVES AND HATES<br>AT 2 MONTHS, (MAX) LOVES:<br><br>AT 2 MONTHS, (MAX) HATES:<br>_____ |

240 ← (points to FAVORITE THINGS ABOUT (MAX) cell)
200 ←
210 ⎫ (bracket on left)

*FIG. 2.*
CONTINUED

PROMPTING SERVICE

CROSS-REFERENCE TO RELATED APPLICATIONS

This patent application is a continuation of pending U.S. application Ser. No. 13/112,900, filed on May 20, 2011, entitled "Prompting Service," and the entirety of which is hereby incorporated by reference.

BACKGROUND

Increasingly, online locations are being established to receive and organize collections of media. These online locations (e.g., web sites and social networks) are configured to allow a user to upload their media upon visiting the web site. Occasionally, the online locations provide rudimentary mechanism(s) that communicate with the user for the purpose of reminding the user of their relationship with the online location. Yet, these communications are simple in form and unsophisticated in timing and content of delivery. As such, the user is not encouraged to submit additional media to the online location or revisit the online location to access their media residing thereon. Accordingly, a novel service that introduces technology for intelligently soliciting, compiling, and managing the user's media would fully engage the user with the service and result in a robust collection of the user's media/content at a single access-point.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Embodiments of the present invention introduce a service for gathering and managing digital content to establish a compilation (e.g., journal, photo album, or scrapbook) of the digital content in an online location. Often, the digital content is related in some manner to an event (e.g., family vacation, wedding preparation, a baby's first year, and other meaningful occasions). In an exemplary embodiment, the service periodically sends communications to a customer of the service in order to solicit information from the customer, where the solicited information generally revolves around one or more events, or "occasions," that the customer has previously established with the service. As such, these solicitation-type communications, or "prompts," allow the service to help the customer capture thoughts and memories along the way and as the occasion is happening.

By way of example, the service may carry out various steps in order to ensure that the user's digital-content compilation for a particular occasion is being updated. Initially, the service may solicit information from a customer of the service by sending communications (e.g., emails or other digital prompts) to the customer on one or more of the customer's devices (e.g., smart phone, home computer, PDA, laptop computer, and other computing devices) that are recognized by the service. In some embodiments, the customer's device(s) are recognized by the service upon installing an application thereto. Or, in other embodiments, when the customer's device(s) are not recognized by the service, the customer may interface with the service over a pre-established networking account (e.g., email account or digital-media plan with a telecommunications company) that is known by the service.

Upon the customer responding to the communication(s), the service may read the response and extract digital content (e.g., text, digital photos, video images, audio data, and the like) and/or textual information therefrom. The service is configured to then arrange the extracted digital content and textual information in an organized fashion by using pre-defined formatting (e.g., slide shows, photo books, timelines, and greeting cards). Typically, the arrangement corresponds with the occasion (e.g., vacation, wedding, arrival of a newborn) that was selected by the customer upon setting up an account with the service. The resulting digital-content compilation may be posted in a secure online location that allows the customer to access, manually edit, and distribute the information (e.g., digital content and textual information) previously submitted by the customer.

In one particular instance of the present invention, upon the customer selecting an occasion with the service, the service may tailor the communications to the customer in accordance with a theme surrounding the occasion. For example, if the customer selects an occasion dealing with her first baby boy, the service will offer a selection of appropriate themes for the selected occasion and alter or customize communications with the customer to express the identified theme. In this example, altering the communications with the customer may include the following: preparing a caption or title of the communication to reference a baby boy; incorporating a background design (e.g., wallpaper) or graphical elements into the communication that relate to a baby boy; and including text within the communication that solicits information (e.g., digital media or textual information) specifically about a baby boy.

Further, the theme of the selected occasion may permeate the online location that is established to host the customer's account. With reference to the example theme of "baby boy" above, the service may arrange the digital media received from the customer in a manner that relates to the theme, such that the digital media is ordered via a timeline that tracks childhood development of the subject (i.e., the baby boy) of the occasion. In another instance, the digital media is arranged, in part, by information (e.g., comments, caption, or other descriptors) received from the customer that accompanies the digital media. In yet another instance, the digital content is organized by information (e.g., time and date) automatically deciphered from the customer's response or the digital media provided. For example, the service may automatically decipher that the media content (e.g., digital images, video files, audio recordings, and the like) is related to a first birthday of the baby boy because the digital photo was sent in a response to the service's communication soliciting pictures from the subject's birthday party.

These communications from the service that solicit content from the customer may be sent according to a prompting scheme that is dynamically updated by the service. Initially, when developing the prompting scheme, information is accessed that describes preferences of the customer. In embodiments, this information is aggregated by receiving the information explicitly upon the customer establishing or updating configuration settings of an account with the service and/or by extracting the information implicitly from the customer's interactions with the service. This information may then be used to derive a prompting scheme that governs scheduling of communication(s) that are automatically distributed to the customer. Typically, the communication(s) are designed to solicit feedback from the customer. At some later point in time, subsequent to delivering the communication(s), a response from the customer that includes content is received at the service. The service, generally on a real-time basis, extracts the content from the response and publishes the received content in a coordinated fashion at a secure online location that is managed by the service. Typically, the content is published as part of a themed compilation, or project. In some embodiments, because the customer could have multiple ongoing projects with the service at the same time (e.g., concurrently contributing to a baby's first year photo book, a photo slide show, and a print-on-demand card), the online location may host and provide access to these various projects in connection with the customer's account.

As such, the technology introduced by embodiments of the present invention enables automatically prompting a customer to provide content and compiling the content at an online location. With regard to automatically prompting the customer, embodiments of the present invention involve developing a distribution schedule that may be manipulated based on interactions measured from the customer (e.g., behavior exhibited by the user upon the prompt being delivered). This distribution schedule influences the timing of when prompts are issued to the customer and/or the content of the prompts.

BRIEF DESCRIPTION OF THE DRAWINGS

Embodiments of the invention are described in detail below with reference to the attached drawing figures, wherein:

FIG. 2 is an exemplary depiction of an illustrative prompt list, in accordance with embodiments of the present invention;

DETAILED DESCRIPTION

Figure 1:
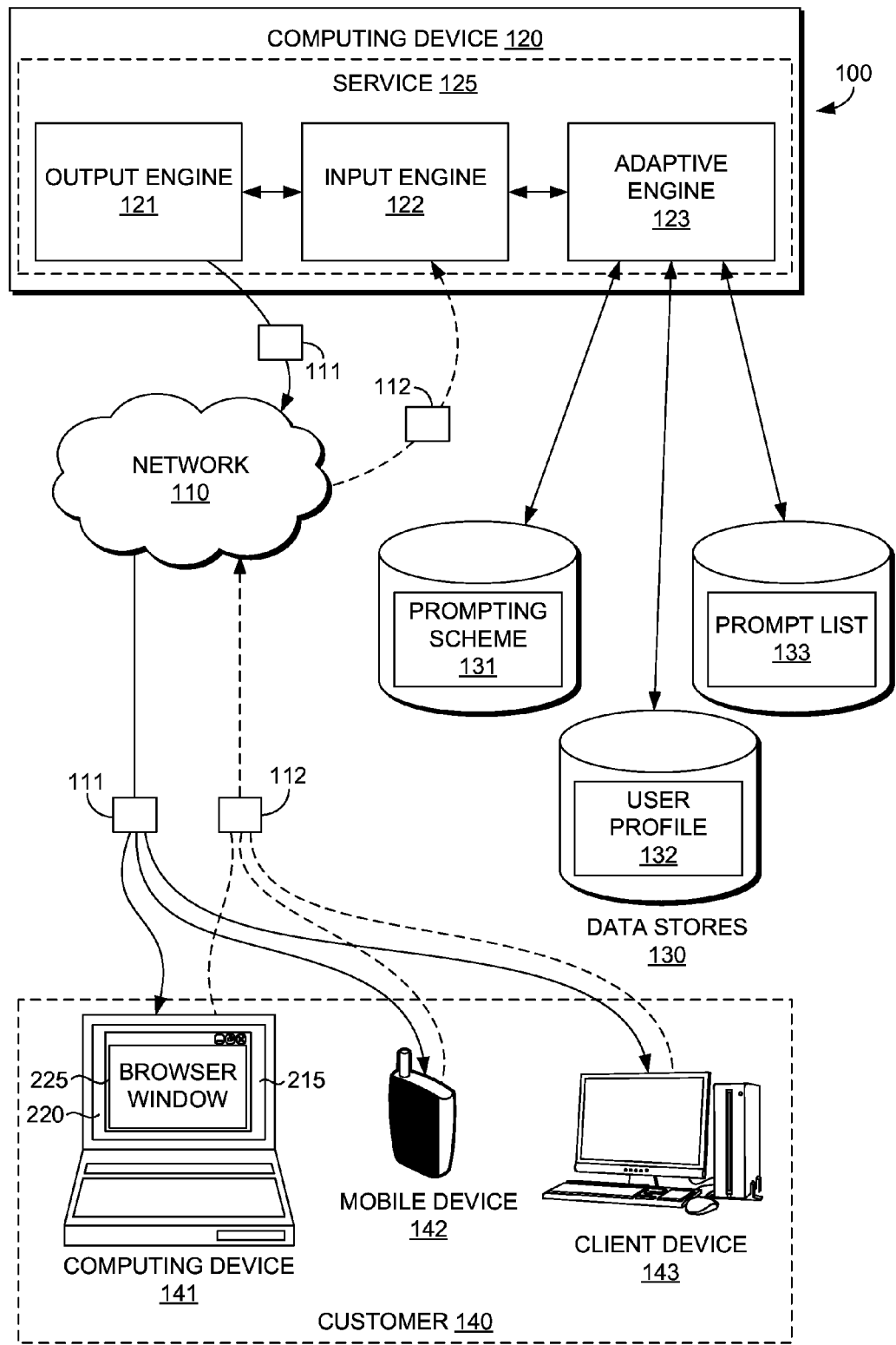
FIG. 1 is a schematic diagram of an exemplary system architecture of a distributed computing environment configured for use in implementing embodiments of the present invention.
Figure 3:
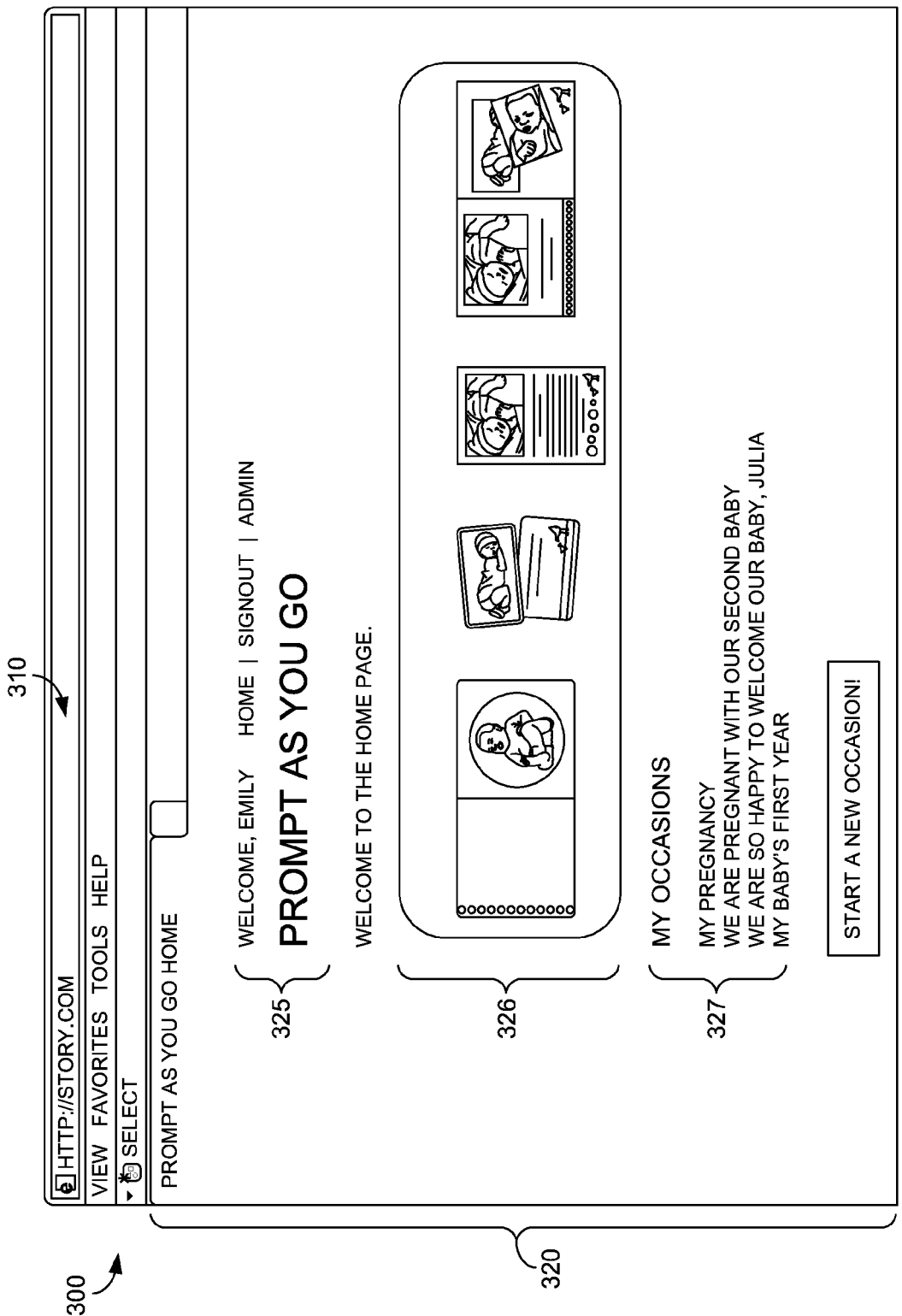
FIG. 3 is a schematic diagram depicting a first illustrative User Interface ("UI") display that includes a representation of a web page for accepting user-initiated selections of occasions, in accordance with embodiments of the invention.

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Generally, embodiments of the present invention introduce technology for requesting feedback from a customer of a service by sending communications (e.g., emails or text messages) according to a prompting scheme, where the prompting scheme is dynamically updatable by the service as a function of interactions measured from the customer. Further, embodiments of the present invention involve organizing content, which is received in response to the communications, and formatting the communications based on a theme, where the theme is distilled from an occasion (e.g., vacation, arrival of a newborn, and wedding) selected by the customer.

Initially, upon a customer signing up for the service, the customer is offered the opportunity to select the temporal criteria for receiving prompts. For instance, selecting the "temporal criteria" may involve permitting the customer to specify how often (e.g., daily, bi-weekly, weekly, on holidays, etc.) s/he prefers to receive a communication from the service. Accordingly, these temporal criteria are employed to establish an initial version of a prompting scheme that influences scheduling of the communications. Further, the customer is offered the opportunity to select an occasion that sets the theme for their online compilation. In operation, the theme affects the content of the message (i.e., the concept underlying the purpose of the solicitation for feedback) conveyed within the communications. By way of example, the customer may want to focus upon a vacation in progress. Accordingly, the customer may select an occasion that relates to taking a vacation, where the taking-a-vacation occasion governs the composition of the communications to the customer such that the communications act to solicit information about the ongoing vacation, as opposed to another event in the customer's life.

Upon receiving the communications, the customer may provide media content and textual information (hereinafter collectively referred to as "content") that is responsive to the communication. Typically, this content is specifically solicited by the communications. Also, this content may then be assembled within an online compilation that is formatted in accordance with the selected theme. Formatting the information may involve populating a template or layout with the content. In one instance, the content is entered within the template or the layout based on user-provided information accompanying the content. Upon reading the user-provided information, the service automatically formats the content and incorporates the formatted content into ongoing project(s) (e.g., active compilation(s) associated with the selected occasion), uses the formatted content to memorialize events as they are happening, and suggests product outputs (e.g., greeting cards, photo books, photo slideshows, and the like) from the content customers have provided.

The service may employ engines to implement operations associated with advancing the customer's project(s). In one instance, an output engine is employed to compose and send communications that solicit feedback from the user. An input engine may be employed to receive content from the customer in response to the solicitations. An adaptive engine may be employed to learn from the content received from the customer, as well as from the interactions between the customer and the service, and to automatically tailor the message of the communications to the customer and/or the timing of distribution of the communications.

By way of example, the adaptive engine may glean from the customer's content (e.g., information provided to the service upon configuring an account) the occurrence of a birthday of the customer's child. Accordingly, the adaptive engine may tailor a pending communication by adding relevant language that asks about the child's birthday, while delivering the communication on or near the child's birthday. This may occur even if the date of the child's birthday was not originally established by the customer within the temporal criteria.

The adaptive engine may also learn preferences of the customer by monitoring and analyzing the customer's behavior (e.g., timeliness of the customer's responses and the type of information provided within the responses). By way of example, the understanding of the customer's behavior allows the adaptive engine to recognize one or more projects are nearing completion or to adjust the frequency at which communications are sent to the customer. Accordingly, the adaptive engine can self-customize the service to correspond with preferences of the customer.

Finally, the service may post the formatted content of the ongoing project(s) at a secure online location such that the customer can follow the progress of the project(s). This secure online location may be web page at a website, which is typically managed by the service. Or, in other embodiments, the secure online location may be a local storage space on one of the customer's devices. Upon accessing the project(s) online or locally, any number and type of editing tools may be offered to the customer for modifying the content posted by the service. Further, the service may include communication capabilities that allow the customer to send out the posted content to friends, family, or members of a distribution list.

Having described an overview of embodiments of the present invention, an exemplary operating environment in which embodiments of the present invention may be implemented is described below in order to provide a general context for various aspects of the present invention.

The following discussion describes various embodiments of the present invention. Note that several of the exemplary embodiments described below are based on specific applications of a service to make the discussion more concrete. However, aspects of the present invention should not be construed as being limited to these particular applications. That is, embodiments of the present invention may be designed to be applied to differing computing environments having disparate capabilities.

Referring initially to FIG. 1 in particular, a schematic block diagram of an exemplary system architecture of a distributed computing environment 100 configured for use in implementing embodiments of the present invention is shown. Initially, the distributed computing environment 100 includes a service 125 running on a computing device 120. Functionality of the computing device 120 may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments 100 where tasks are performed by remote-processing devices that are linked through a communications network 110.

In embodiments, the computing device 120 includes a bus that directly or indirectly couples the following devices: memory, one or more processors, one or more presentation components, input/output (I/O) ports, input/output components, and an illustrative power supply. The bus represents what may be one or more busses (such as an address bus, data bus, or combination thereof). Further, the computing device 120 typically includes a variety of computer-readable media. Computer-readable media can be any available media that can be accessed by computing device 120 and includes both volatile and nonvolatile media, removable and nonremovable media. By way of example, and not limitation, computer-readable media may comprise computer storage media and communication media. Computer storage media includes both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 120.

Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Technology, introduced by embodiments of the present invention, involves a customer 140 interacting with the service 125 in order to establish an account and develop, over time, project(s) associated with the account that track one or more occasions or events that the customer 140 is experiencing. The exemplary system architecture of the distributed computing environment 100 is employed to carry out these above-mentioned goals. It should be understood and appreciated that the exemplary system architecture shown in FIG. 1 is merely an example of one suitable computing environment and is not intended to suggest any limitation as to the scope of use or functionality of the present invention. Neither should the exemplary system architecture be interpreted as having any dependency or requirement related to any single component or combination of components illustrated therein.

Initially, the exemplary system architecture includes a computing device 120, a computing device 141, a mobile device 142, a client device 143, data stores 130, and a network 110 that interconnects each of these items. The computing device 141, mobile device 142, and client device 143 are each registered to the customer 140 and shall be hereinafter collectively referred to as the devices 141-143. Each of the computing device 120, the data stores 130, and the devices 141-143 shown in FIG. 1, may take the form of various types of computing devices. By way of example only and not limitation, the computing device 120, the data stores 130, and the devices 141-143 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Typically, each of the computing device 120, the data stores 130, and the devices 141-143 is linked to some form of computing unit (e.g., central processing unit, microprocessor, etc.) to support operations of the component(s) running thereon (e.g., engines 121-123 and the like). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the computing device 120, the data stores 130, and the devices 141-143 to enable each device to perform communication-related processes and other operations (e.g., accessing the data stores 130 or updating a prompting schedule or scheme 131). In another instance, the computing unit may encompass a processor (not shown) coupled to the computer-readable medium, as discussed above.

Generally, the computer-readable medium includes physical memory that stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Also, beyond processing instructions, the processor may transfer information to and from other resources that are integral to, or disposed on, the computing device 120, the data stores 130, and the devices 141-143. Generally, resources refer to software components or hardware mechanisms that enable performance of a particular function. By way of example only, the resources accommodated by the computing device 120 may include one or more of the engines 121-123.

The computing device 141 may include an input device (not shown) and a presentation device 215. Generally, the input device is provided to receive input(s) affecting, among other things, a presentation of content at the online location in a browser window 225 surfaced at a UI display area 220. Illustrative input devices include a mouse, joystick, key pad, microphone, I/O components of FIG. 1, or any other component capable of receiving a user input and communicating an indication of that input to the computing device 120. By way of example only, the input device facilitates entry of content and the location of a selection tool (e.g., mouse pointer) hovering over a manifest of options, as discussed below.

In embodiments, the presentation device 215 is configured to render and/or present the UI display 220 thereon. The presentation device 215, which is operably coupled to an output of the computing device 141, may be configured as any presentation component that is capable of presenting information to a user, such as a digital monitor, electronic display panel, touch-screen, analog set top box, plasma screen, audio speakers, Braille pad, and the like. In one exemplary embodiment, the presentation device 215 is configured to present rich content, such as the browser window 225 that includes a display area populated with content of the customer's compilation (e.g., digital images). In another exemplary embodiment, the presentation device 215 is capable of rendering other forms of media (e.g., textual information as journal entries).

The data store(s) 130 are generally configured to store information associated with the customer 140 and/or attributes and preferences of the customer 140, as discussed below. In various embodiments, such information may include, without limitation, a prompting scheme 131, a user profile 132 (e.g., maintaining attributes of the customer 140), and a prompt list 133. In addition, the data store(s) 130 may be configured to be searchable for suitable access of the stored information. For instance, the data store(s) 130 may be searchable for temporal criteria entered by the customer 140 that dictate a frequency at which communications are distributed from the service 125. It will be understood and appreciated by those of ordinary skill in the art that the information stored in the data store(s) 130 may be configurable and may include any information relevant to the maintenance of an online compilation. The content and volume of such information are not intended to limit the scope of embodiments of the present invention in any way. Further, though illustrated as single, independent components, the data store(s) 130 may, in fact, be a plurality of databases, for instance, a database cluster, portions of which may reside on the computing device 120, the devices 141-143, another external computing device (not shown), and/or any combination thereof.

This exemplary system architecture is but one example of a suitable environment that may be implemented to carry out aspects of the present invention and is not intended to suggest any limitation as to the scope of use or functionality of the invention. Neither should the illustrated exemplary system architecture be interpreted as having any dependency or requirement relating to any one or combination of the computing device 120, the data stores 130, the devices 141-143, and engines 121-123, as illustrated. In some embodiments, one or more of the engines 121-123 may be implemented as stand-alone devices. In other embodiments, one or more of the engines 121-123 may be integrated directly into the computing device 120, or on distributed nodes that interconnect to form the computing device 120. It will be understood by those of ordinary skill in the art that the engines 121-123 are exemplary in nature and in number and should not be construed as limiting.

Accordingly, any number of components may be employed to achieve the desired functionality within the scope of embodiments of the present invention. Although the various components of FIG. 1 are shown with lines for the sake of clarity, in reality, delineating various components is not so clear, and, metaphorically, the lines would more accurately be grey or fuzzy. Further, although some components of FIG. 1 are depicted as single blocks, the depictions are exemplary in nature and in number and are not to be construed as limiting (e.g., although only one presentation device 215 is shown, many more may be communicatively coupled to the computing device 141).

Further, the devices of the exemplary system architecture may be interconnected by any method known in the relevant field. For instance, the computing device 120 and the devices 141-143 may be operably coupled via a distributed computing environment that includes multiple computing devices coupled with one another via one or more networks 110. In embodiments, the network 110 may include, without limitation, one or more local area networks (LANs) and/or wide area networks (WANs). Such networking environments are commonplace in offices, enterprise-wide computer networks, intranets, and the Internet. Accordingly, the network is not further described herein.

In operation, the engines 121-123 are designed to perform a process that includes, at least, the steps of sending communication(s) 111 that solicit feedback from the customer 140 and accepting responses 112 that convey content for incorporation into ongoing project(s). Initially, as illustrated in FIG. 1, the customer 140 may set up an account with the service 125. In some embodiments, setting up the account may involve linking email addresses to or registering phone numbers with the service. In these embodiments, the customer may provide their phone number, email address, and/or text-messaging address to the service when establishing configuration settings for the customer's account. In other embodiments, the customer may allow the devices 141-143 to be recognized by the account. In these embodiments, the communications 111 sent to the devices 141-143 are configured based on a known type of device, upon being recognized by the service. Alternatively, the communications 111 may be system agnostic, yet cater to the customer's preferences (e.g., there exists a pre-established desire to receive communications 111 as text messages).

When setting up the account, the service 125 may request that the customer 140 explicitly provide information that assists the service 125 in guiding the customer 140 through the design and maintenance of the online compilation. For instance, the service 125 may present a plurality of customizable options that the customer 140 may select. In embodiments, the customizable options may include a listing of topics, occasions, or "stories," that are to be the theme of the online compilation. In other embodiments, the customizable options may include temporal criteria of the communications 111 distributed from the service 125. Generally, the "temporal criteria" set a timeframe for receiving communications 111 that solicit content from the customer 140. By way of example, the customer 140 may set the temporal criteria such that emails are sent twice a week to the customer 140, where the emails solicit feedback from the customer to provide content that adds to an online compilation.

Typically, the temporal criteria are used to establish an initial configuration of the prompting scheme 131. As used herein, the phrase "prompting scheme" is meant to be interpreted broadly and acts to control when, what, and how communications 111 are distributed from the service 125 to the customer 140. In embodiments, the prompting scheme 131 controls a schedule that influences when communications 111 are sent to the customer 140. In addition, the prompting scheme 131 may control the type of solicitation (e.g., requesting content and comments regarding a vacation) carried within the communications 111. As discussed above, the prompting scheme 131 may be updated by monitoring and analyzing interactions between the customer 140 and the service 125.

In other embodiments, the manifest of options may allow the customer 140 to indicate aspects surrounding the selected occasion. For instance, if the selected occasion relates to the arrival of a child (i.e., the subject of the online compilation), the customer may be asked to input such aspects as the gender and the birthday of the subject. As a result, the service 125 may generate a gender-appropriate theme for the online compilation or use the subject's birthday to internally track age, thereby avoiding irrelevant communications 111, such as asking if the subject has talked during the subject's first year. Further, the service's knowledge of the subject's birthday may allow for prediction of what is happening at certain phases of the subject's development and for generation of age-appropriate solicitations.

In a particular embodiment of the present invention, the prompting scheme 131 may interact with the prompt list 133 to arrive upon the appropriate type of solicitation that is presented to the customer 140. With reference to FIG. 2, an exemplary prompt list 200 is illustrated, where the entries within the prompt list 200 are focused on a newborn-baby-style occasion. Thus, in this example, the customer 140 had previously selected an occasion of "baby" from the manifest of options, which sets a theme for the online compilation. The adaptive engine 123 may then access the prompting scheme 131 to determine the age of the subject of the occasion and compare the age against the timeframe 210 to identify those solicitations that are age-appropriate. For instance, if the subject is about three weeks old, the solicitation 230 may be identified for distribution to the customer 140.

Further, the adaptive engine 123 may access the prompting scheme 131 to determine the temporal criteria 280 defined by the customer 140 in order to identify a time-appropriate solicitation. By way of example, if the customer 140 indicated that s/he prefers to receive communications 111 three times a week, the solicitation 250 may be identified as time-appropriate. Further yet, the adaptive engine 123 may access the prompting scheme 131 to determine what type of solicitation the customer 140 prefers (e.g., concise or detailed solicitations within the communications 111 from the service 125). If the customer 140 prefers concise solicitations, the solicitation 240 may be identified as format-appropriate, where the solicitation 240 simply prompts the customer 140 to fill in blanks or offer pertinent information. In contrast, if the customer 140 prefers complex solicitations, the solicitation 260 may be identified as format-appropriate, where the solicitation 260 prompts the customer 140 to provide detailed information (e.g., recounting a story or memory of the subject). It should be noted that the format, or composition, of the solicitation being sent to the customer 140 may be established initially (e.g., through the selections at the manifest of options) or updated dynamically (e.g., upon monitoring and analyzing the customer's behavior with respect to certain types of solicitations).

Turning back to FIG. 1, upon the adaptive engine 123 identifying a type of solicitation to send to the customer 140, the output engine 121 proactively sends out the solicitation within one or more communications 111. These communications 111 may be formatted based on the theme of the selected occasion. For instance, if the occasion of a wedding is selected, the communications 111 may be formatted with a template or background that expresses the theme of the wedding (e.g., graphical elements of a wedding dress and cake). Further, a color pallet of the communications 111 may correspond with the subject's chosen wedding colors, upon the customer 140 providing such information. Accordingly, the theme of the selected occasion is coordinated throughout the customer's 140 experience with the service 125 (e.g., employing the theme to establish a design of the online location at which the customer's project(s) are posted).

In an exemplary embodiment, the customer 140 may select an occasion and, at a later time, select an assignment relevant to the occasion. As used herein, the term "assignment" generally pertains to a project within a project, where the customer 140 asks for additional solicitations related to a specific concept. By way of example, if the selected occasion represents a vacation, the assignment may relate to a day-trip during the vacation. Thus, in this example, the output engine 121 may be configured to send communications 111 that solicit specific feedback (e.g., digital photos and commentary) surrounding a particular day of a vacation.

Besides accepting user-initiated assignments, the service 125 may automatically invoke assignments based on information provided by the customer 140 and/or external data. Those automatically invoked assignments that are based on customer-provided information may include age-appropriate solicitations for content of a subject's birthday. In other embodiments, those automatically invoked assignments that are based on external data may include season-appropriate solicitations for content related to a holiday or time of year.

Upon receiving the communications 111 at one or more of the devices 141-143, the customer 140 may elect to reply to the solicitations within the communications 111 by providing a response 112. The response 112 may include any form of content (e.g., digital media, textual information, and the like) and may incorporate or respond to all or part of the solicitation of the communication 111, as more fully discussed below. In one instance, the response 112 may be a communication (e.g., email or text message) carrying content from the customer 140 in reply to the communication 111. In another instance, the response 112 may be an upload of content to an online location (e.g., uploading a digital photo to a web page assigned to the customer 140). In an exemplary embodiment, the customer 140 may navigate to the online location upon selecting a link embedded within the communication 111.

The input engine 122 is enabled to receive the response 112 and extract the content and accompanying information therefrom. That is, the input engine 122 is configured to consume the response 112, recognize the content, and pull the content from the response 112 for incorporation within the customer's online compilation (e.g., submit the content as an entry into a journal). In an exemplary embodiment, the input engine 122 interfaces with the adaptive engine 123 to facilitate updating the prompting scheme 131 by exposing how the customer is currently replying to the communications 111.

Although the responses 112 have been described as being provided by the customer 140, it should be understood and appreciated that other entities may provide the responses 112 to the service 125, and that embodiments of the present invention are not limited specific individuals as described herein. For instance, content may be provided by other people besides the customer 140, or may be retrieved from other data stores 130 besides the manual uploads.

Turning now to FIGS. 3-6, schematic diagrams depicting illustrative UI displays, in accordance with embodiments of the invention, will now be discussed. Initially, the UI display 300 depicts a representation of a web page 320 for accepting user-initiated selections of occasions. In embodiments, the web page 320 may belong to a website 310 managed by the service and generated for the customer upon establishing an account. As illustrated in the exemplary embodiment, the web page 320 includes a title bar 325 (e.g., confirming an identity of the customer), a manifest of options 327 (e.g., prompting the customer to select an occasion to be the theme of the project(s)), and a plurality of products 326 that are generated using the content and information provided by the customer. As more fully discussed below, the plurality of products 326 may be available for purchase and, thus, developed to monetize the service.

Figure 4:
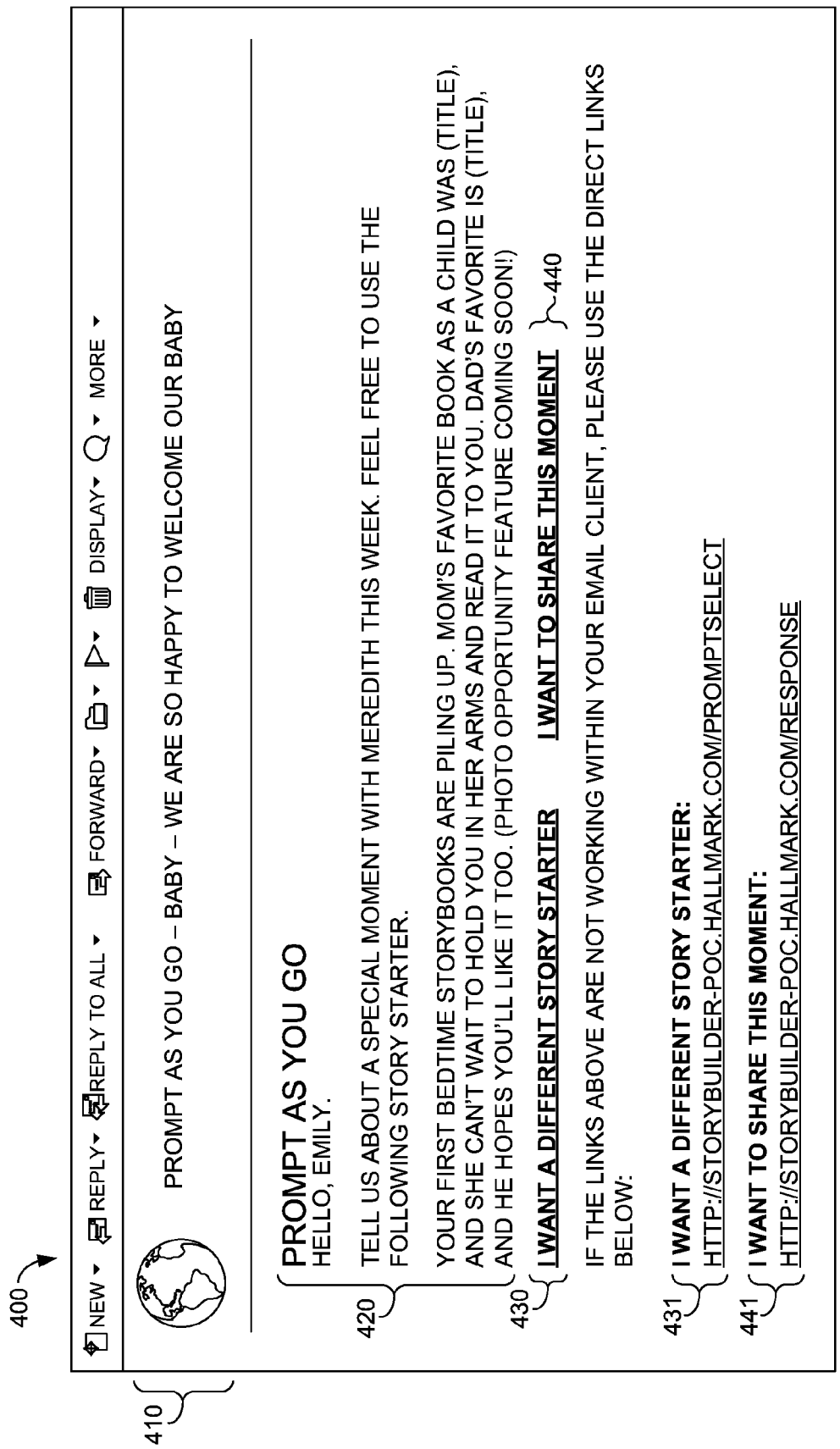
FIG. 4 is a schematic diagram depicting a second illustrative UI display that includes a representative communication sent to a customer to solicit feedback from the customer, in accordance with embodiments of the invention.

Referring to FIG. 4, a schematic diagram depicting an illustrative UI display 400 that includes a representative communication sent to a customer to solicit feedback from the customer is shown, in accordance with embodiments of the invention. The communication (e.g., communication 111 of FIG. 1) includes a title bar 410 (e.g., articulating the occasion selected by the customer), a solicitation 420 (e.g., identified from the prompt list 133) and links 430, 431, 440, and 441. As discussed above, the solicitation 420 is employed to gather content from the customer to update the online compilation. In embodiments, the links 430, 431, 440, and 441, upon selection, navigate the customer to either the online location of the compilation (e.g., links 430 and 431) or allow the customer to transfer the content to a third party (e.g., 440 and 441). Alternatively, the links 430 and 431 could prompt the output engine 121 to send out an alternate solicitation in a new communication 111 to be responded to by the customer.

Figure 5:
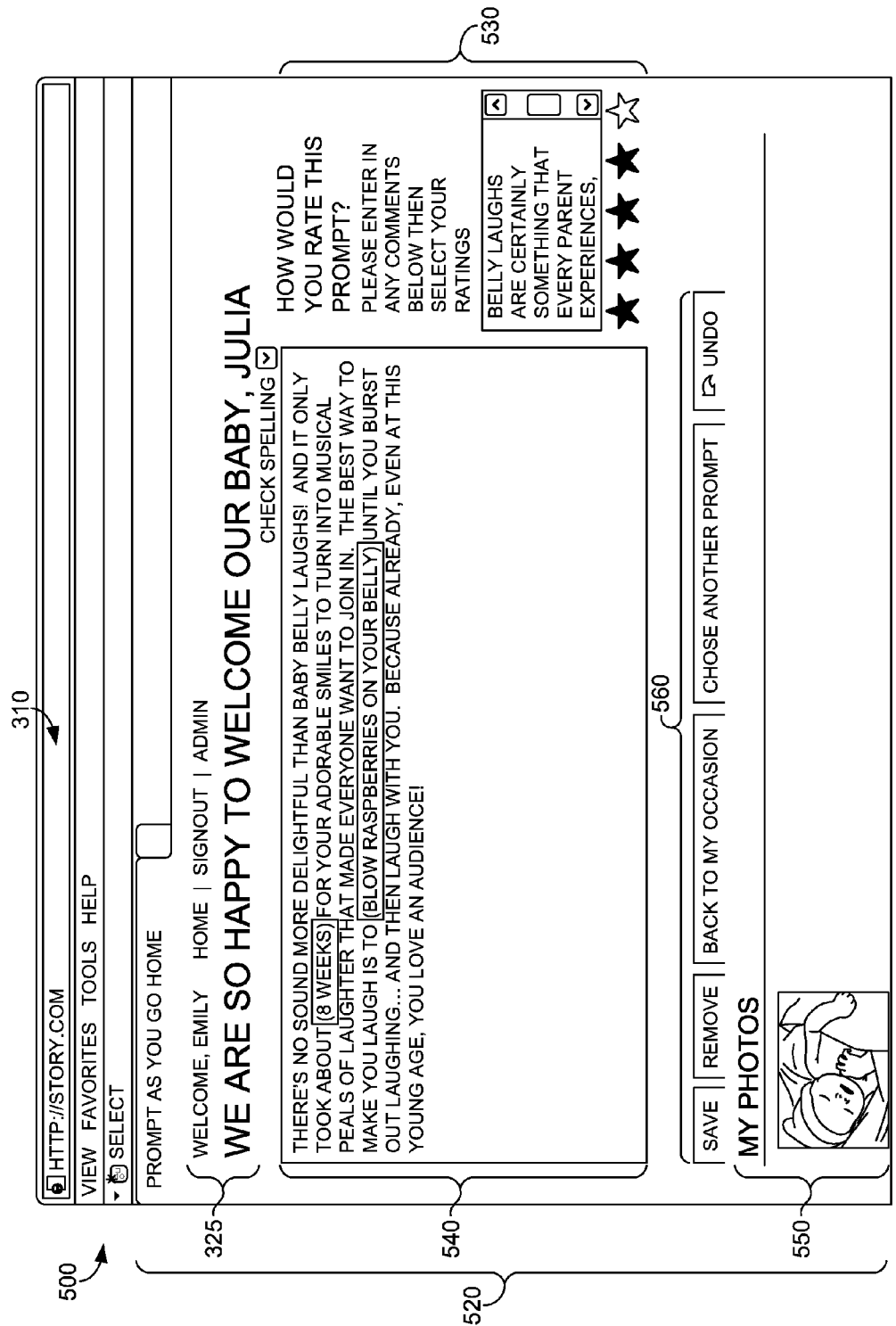
FIG. 5 is a schematic diagram depicting a third illustrative UI display that includes a display area configured for exposing a web page designed to receive content from the customer, in accordance with embodiments of the invention.

Upon selecting one of the links 430 or 431, the customer may arrive at an online location established for receiving content. Turning now to FIG. 5, a schematic diagram depicting an illustrative UI display 500 that is configured for exposing a web page 520 designed to receive content from the customer is shown, in accordance with embodiments of the invention. The content may take the form of the solicitation 540 within additional information added by the customer. Or, in other embodiments, the content may take the form of digital media (e.g., image 550) that is imported to the online compilation. Further, in an exemplary embodiment, the UI display may include a survey mechanism 530 for rating the solicitation 540. In embodiments, the rating may be sent to the adaptive engine (e.g., reference numeral 123 of FIG. 1) for the purpose of customizing the topic and/or composition of the communications sent to the customer.

Figure 6:
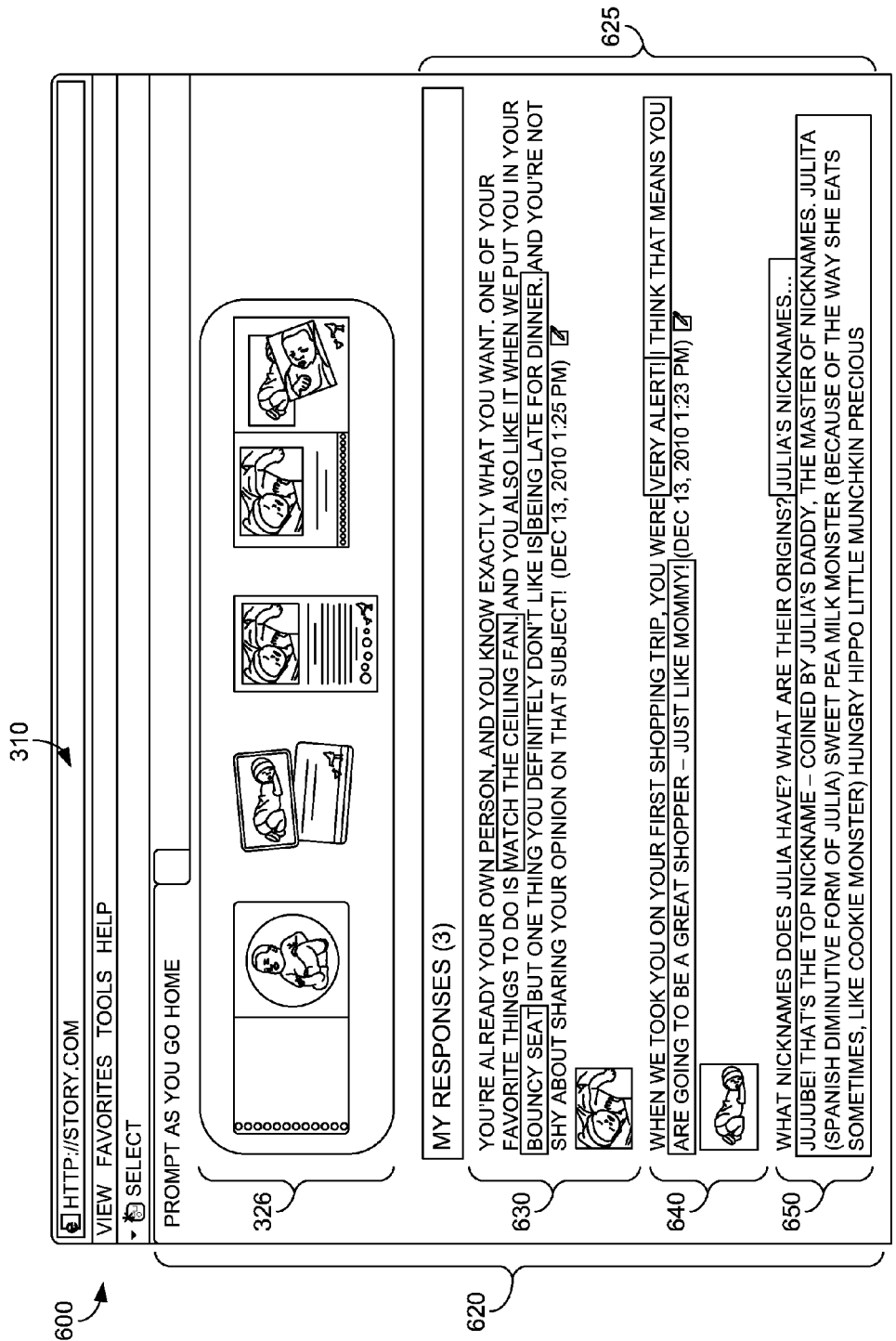
FIG. 6 is a schematic diagram depicting a fourth illustrative UI display that includes representations of entries to a journal that reflect content provided by the customer, in accordance with embodiments of the invention.

With reference to FIG. 6, a schematic diagram depicting an illustrative UI display 600 that includes representations of entries 630, 640, and 650 to a journal 625 that reflect content provided by the customer is shown, in accordance with embodiments of the invention. As illustrated, the occasion selected by the customer relates to the first year(s) of a newborn. As such, the entries 630, 640, and 650 portray content that describe events of the subject's development. These entries 630, 640, and 650 show content that includes solicitations, textual information, and digital media. However, it should be understood and appreciated that the entries 630, 640, and 650 may include any type of content known in the relevant field of technology.

In embodiments, the plurality of products 326 is shown within the UI display 600. These products 326 are ones that correspond with the occasion targeted by the customer. For instance, the products 326 may involve the theme that is distilled from the occasion selected by the customer. Further, the products 326 may be customized and generated to include content provided by the customer, such that the products 326 are enticing for purchase. These products 326 are not limited to any specific items and may include such consumables as photo albums, electronic greetings, personalized messages populated with the content, photo books that incorporate graphical elements associated with the theme, e-cards (e.g., baby business cards or wedding save-the-date cards), ornaments, video slide shows with a playlist of the content, calendars, etc. In one embodiment, a curator component is responsible for organizing the content into the products 326. Typically, organizing the content involves tagging the content using information (e.g., metadata) accompanying the content, selecting a layout of the products 326 based on the theme, and populating (e.g., locating and orientating the content within the layout) in accordance with the tags. In another embodiment, or in parallel with the embodiment above, customers may supply metadata by tagging content prior to, or subsequent to, submission to the service. In this way, the service is operable to accept from disparate sources a variety of metadata appended to the submitted content (i.e., including external and internal contributors) and is designed to merge the metadata intelligently such that the content is appropriately categorized upon being published at the online compilation(s) and/or properly labeled upon being incorporated within the ongoing project(s).

Figure 7:
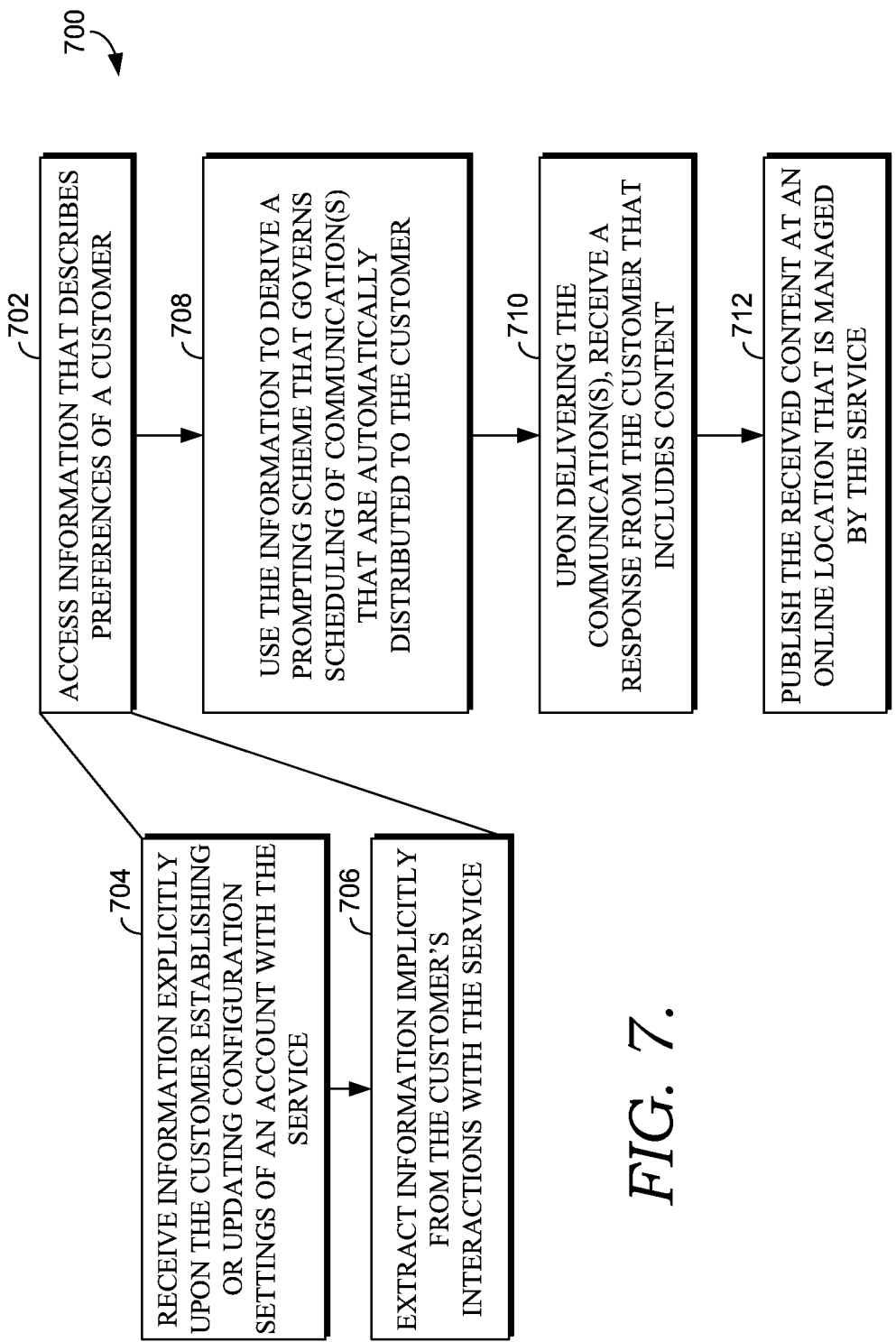
FIG. 7 is an overall flow diagram of a method for prompting the customer of the service to submit the content for the purpose of generating an online compilation, in accordance with embodiments of the invention.

Turning now to FIG. 7, an overall flow diagram of a method 700 for prompting the customer of the service to submit the content for the purpose of generating an online compilation is shown, in accordance with embodiments of the invention. Although the terms "step" and/or "block" may be used herein to connote different elements of methods employed, the terms should not be interpreted as implying any particular order among or between various steps herein disclosed unless and except when the order of individual steps is explicitly described.

Initially, when developing the prompting scheme, information is accessed that describes preferences of the customer, as depicted at block 702. In embodiments, this information is aggregated by receiving the information explicitly upon the customer establishing or updating configuration settings of an account with the service (see block 704) and/or by extracting the information implicitly from the customer's interactions with the service (see block 706). Extracting the information implicitly may include monitoring time periods at which the customer most commonly responds to communication(s) from the service. This information may then be used to derive a prompting scheme that governs the scheduling of communication(s) that are automatically distributed to the customer, as depicted by block 708. For example, the communication(s) may be scheduled to be automatically distributed at the time periods at which the customer most commonly responds, and the communication(s) may then be automatically distributed according to that prompting scheme. The time periods at which the customer most commonly responds may include at least one of an at-work timeframe or an after-work timeframe. Typically, the communication(s) are designed to solicit feedback from the customer. At some later point in time, upon delivering the communication(s), a response from the customer that includes content is received at the service. This is depicted at block 710. The service, generally on a real-time basis, pulls the content from the response and publishes the received content at an online location that is managed by the service, as depicted at block 712.

Figure 8:
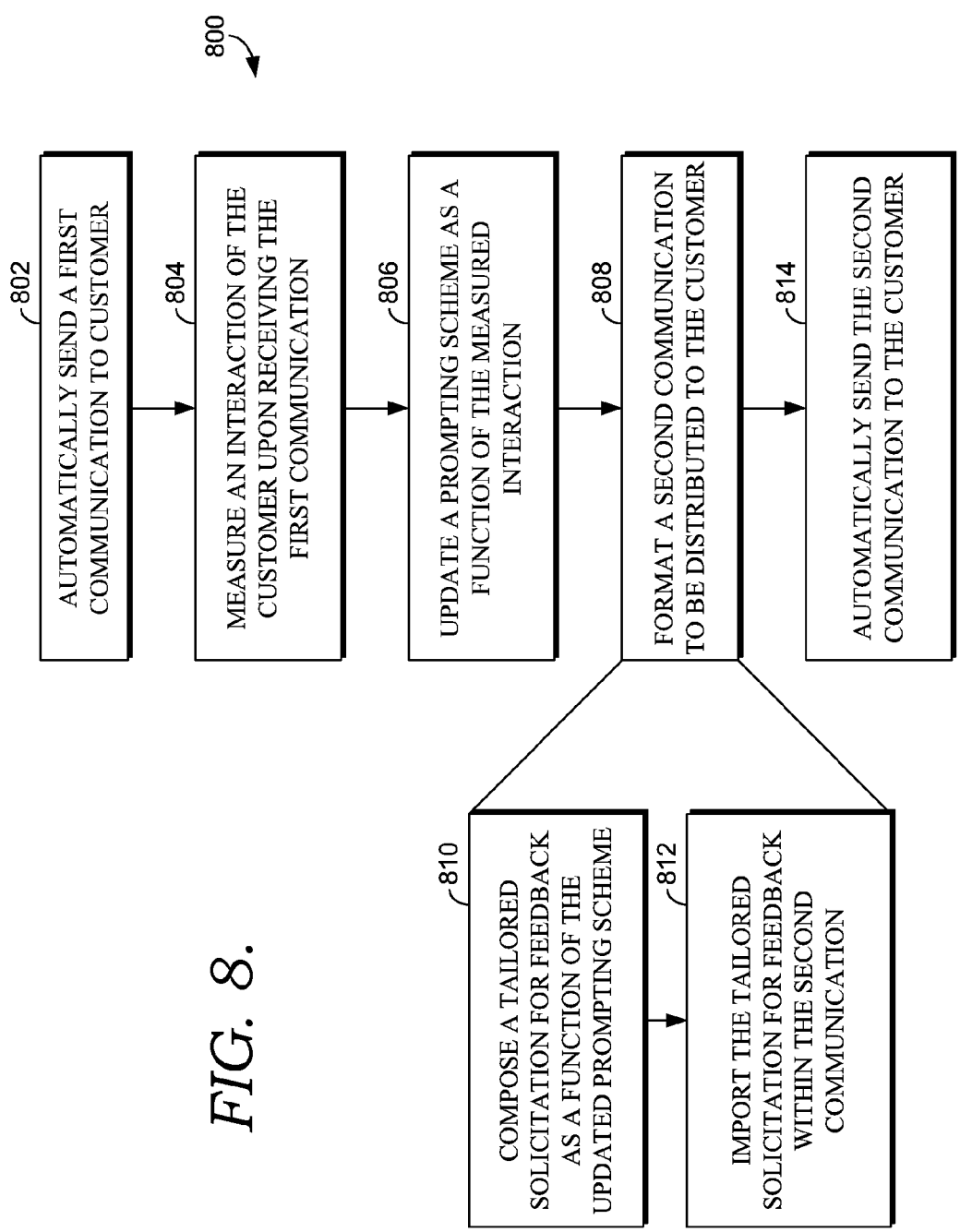
FIG. 8 is an overall flow diagram of a method for adapting a format of a solicitation conveyed within a communication based upon a manner in which a customer interacts with the service, in accordance with embodiments of the invention.

Referring to FIG. 8, an overall flow diagram of a method 800 for adapting a format of a solicitation conveyed within a communication based upon a manner in which a customer interacts with the service is shown, in accordance with embodiments of the invention. The method 800 involves the step of automatically sending a first communication to the customer. Typically, the first communication includes an initial solicitation for feedback with respect to an account established with the service, as depicted at block 802. The interaction between the customer and the service is measured upon receiving the first communication, as depicted at block 804. In embodiments, as depicted at block 806, a prompting scheme may be established or updated as a function of the measured interaction. As depicted at block 808, a second communication may be formatted by the service for distribution to the customer.

The step of formatting the second communication (e.g., language of an email) comprises various processes including the following: selecting language of a tailored solicitation for feedback as a function of the updated prompting scheme (see block 810); and importing the tailored solicitation for feedback within the second communication (see block 812). Upon formatting the second communication, the second communication is sent to the customer, as depicted at block 814.

Various embodiments of the invention have been described to be illustrative rather than restrictive. Alternative embodiments will become apparent from time to time without departing from the scope of embodiments of the inventions. It will be understood that certain features and subcombinations are of utility and may be employed without reference to other features and subcombinations. This is contemplated by and is within the scope of the claims.

The invention claimed is:

1. One or more non-transitory computer-readable media having computer-executable instructions embodied thereon that, when executed by a computing device having a processor and memory, perform a method for prompting a customer of a service to submit digital content to the service in order to generate an online compilation, the method comprising:

receiving a plurality of inputs from the customer of the service, the plurality of inputs received in response to a plurality of communications from the service, wherein the plurality of communications solicit feedback from the customer with respect to the online compilation;

monitoring time periods associated with the plurality of inputs from the customer of the service;

based on a time at which each of the plurality of inputs was received from the customer of the service, determining a most common time period during which the customer provided the plurality of inputs, the most common time period comprising a preferred time period;

at the processor, based on the preferred time period, deriving a prompting scheme that governs scheduling an automatic distribution of one or more subsequent communications to the customer during the preferred time period; and distributing the one or more subsequent communications to the customer in accordance with the prompting scheme such that the one or more subsequent communications are automatically distributed during the preferred time period.

2. The media of claim 1, wherein the method further comprises:

in response to the one or more subsequent communications, receiving a submission of digital content from the customer; and publishing the submitted digital content at an online location that is managed by the service.

3. The media of claim 2, wherein deriving the prompting scheme is further based on temporal criteria indicated by the customer, the temporal criteria relating to a communication timing and a communication frequency.

4. The media of claim 2, wherein the method further comprises receiving a customer selection of an occasion.

5. The media of claim 4, wherein the method further comprises:

based on the occasion and a time associated with the occasion, determining an appropriate type of solicitation to include in the one or more subsequent communications and determining an appropriate time at which to distribute the one or more subsequent communications including the appropriate type of solicitation; and at the appropriate time, distributing the one or more subsequent communications including the appropriate type of solicitation.

6. The media of claim 5, wherein determining the appropriate type of solicitation comprises determining an age-appropriate solicitation based on an age of a child.

7. The media of claim 4, wherein the method further comprises determining a theme based on the customer selection of the occasion.

8. The media of claim 7, wherein a layout of the plurality of communications is formatted based on the theme.

9. The media of claim 7, wherein language of the plurality of communications is based on the theme.

10. The media of claim 2, wherein the online location represents a web page of a website hosted by the service, and wherein the online compilation is posted on the web page and is accessible to the customer.

11. The media of claim 2, wherein the preferred time period represents at least one of an at-work timeframe or an after-work timeframe.

12. A method for prompting a customer of a service to submit digital content to the service in order to generate an online compilation of the digital content, the method comprising:
    sending a plurality of communications to the customer of the service, wherein the plurality of communications solicit feedback from the customer with respect to the online compilation;
    in response to the plurality of communications, receiving a plurality of inputs from the customer of the service;
    based on a time at which each of the plurality of inputs was received from the customer of the service, determining a most common time period during which the customer provided the plurality of inputs, the most common time period comprising a preferred time period;
    based on an interaction of the customer with the plurality of communications, determining a format preference for the customer with respect to the plurality of communications;
    at a computing device having a processor and memory, based on the preferred time period and the format preference, deriving a prompting scheme for automatically distributing to the customer one or more future communications; and
    distributing, by the computing device, the one or more future communications to the customer in accordance with the prompting scheme.

13. The method of claim 12, wherein the format preference for the customer with respect to the plurality of communications comprises either a preference for concise solicitations or a preference for detailed solicitations.

14. The method of claim 13, wherein determining the format preference for the customer comprises determining whether the customer is more responsive to either concise solicitations or detailed solicitations.

15. The method of claim 13, further comprising, based on determining the format preference for the customer comprises the preference for concise solicitations, determining that a communication including a fill-in-the-blank solicitation satisfies the format preference for the customer.

16. The method of claim 15, further comprising distributing the communication including the fill-in-the-blank solicitation to the customer in accordance with the prompting scheme.

17. The method of claim 13, further comprising, based on determining the format preference for the customer comprises the preference for detailed solicitations, determining that a communication including a solicitation for detailed information satisfies the format preference for the customer.

18. The method of claim 17, wherein the solicitation for the detailed information solicits a customer narrative describing a personal story.

19. The method of claim 17, further comprising distributing the communication including the solicitation for the detailed information to the customer in accordance with the prompting scheme.

20. A computer system for establishing a prompting scheme that governs a distribution of communications to a customer of a service, the computer system comprising:
    one or more processors; and
    computer storage memory having stored thereon computer-executable instructions that, when executed by the one or more processors, implement a method comprising:
        receiving a plurality of inputs from the customer of the service, the plurality of inputs received in response to a plurality of communications from the service, wherein the plurality of communications solicit feedback from the customer with respect to an online compilation,
        based on a time at which each of the plurality of inputs was received from the customer of the service, determining a most common time period during which the customer provided the plurality of inputs, the most common time period comprising a preferred time period,
        based on a type of content included in the plurality of inputs, the type of content comprising at least one of a concise content and a detailed content, determining a format preference for the customer,
        based on the preferred time period and the format preference, deriving the prompting scheme that governs a distribution of one or more subsequent communications to the customer of the service, and
        distributing the one or more subsequent communications to the customer in accordance with the prompting scheme.

* * * * *

UNITED STATES PATENT AND TRADEMARK OFFICE
CERTIFICATE OF CORRECTION

PATENT NO. : 9,449,350 B2  
APPLICATION NO. : 14/466595  
DATED : September 20, 2016  
INVENTOR(S) : Brough et al.

Page 1 of 2

It is certified that error appears in the above-identified patent and that said Letters Patent is hereby corrected as shown below:

In the Drawings
FIG. 8, block 802: insert --A-- before "CUSTOMER."

In the Specification
Column 1, Line 15: "web sites" should read --websites--.
Column 1, Lines 16-17: "web site" should read --website--.
Column 1, Lines 28-29: "access-point" should read --access point--.
Column 1, Line 61: "smart phone" should read --smartphone--.
Column 4, Line 57: "slideshows" should read --slide shows--.
Column 5, Line 25: insert --a-- before "web page."
Column 6, Line 19: "includes" should read --include--.
Column 6, Line 32: insert --,-- after "program modules."
Column 6, Line 41: insert --,-- after "infrared."
Column 7, Line 1: remove "," after "FIG. 1."
Column 7, Line 65: "UI display 220" should read --UI display area 220--.
Column 8, Line 3: "touch-screen" should read --touchscreen-- and "set top" should read --set-top--.
Column 8, Line 58: remove "," after "and."
Column 9, Line 37: remove "," after "'stories.'"
Column 9, Line 41: "timeframe" should read --time frame--.
Column 9, Line 46: "customer to" should read --customer 140 to--.
Column 10, Line 20: "timeframe" should read --time frame--.
Column 10, Line 58: "pallet" should read --palette--.
Column 11, Line 5: "day-trip" should read --day trip--.
Column 11, Line 50: insert --to-- after "limited."
Column 12, Line 10: insert --,-- after "prompt list 133)."
Column 12, Line 51: "products 326 is" should read --products 326 are--.
Column 13, Line 46: both instances of "timeframe" should read --time frame--.

Signed and Sealed this
Twenty-eighth Day of February, 2017

Michelle K. Lee
*Director of the United States Patent and Trademark Office*

In the Claims
Column 15, Line 25: "timeframe" should read --time frame--.
Column 15, Line 26: "timeframe" should read --time frame--.